INVENTOR:
Robert J. J. Hamblin

BY: *James R. Hoatson Jr.*
*Philip T. Liggett*
ATTORNEYS

United States Patent Office 3,380,810
Patented Apr. 30, 1968

3,380,810
CATALYTIC CONVERTER-MUFFLER WITH A
PROTECTED CATALYST RETAINER MEANS
Robert J. J. Hamblin, Chicago, Ill., assignor to Universal
Oil Products Company, Des Plaines, Ill., a corporation
of Delaware
Filed Nov. 26, 1963, Ser. No. 326,130
4 Claims. (Cl. 23—288)

ABSTRACT OF THE DISCLOSURE

A catalytic muffler with a layer of low bulk density, inert, porous refractory particles upstream of the catalyst, for preventing flashback and for reducing temperature fluctuations.

---

Figure 1:
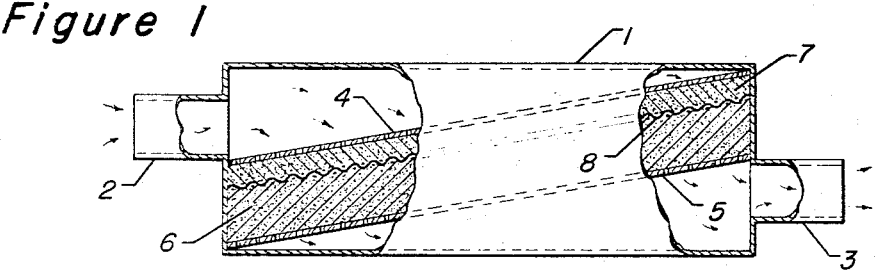

The present invention invention relates to a catalytic converter-muffler with a protected catalyst retainer means and more specifically to the utilization of a gas permeable refractory to provide high temperature insulation and protection for the upstream screen or perforate plate of a catalyst retaining section in the converter.

The conversion and removal of certain oxidizable components from vehicular exhaust gases is presently deemed to be of considerable importance, particularly in the urban areas. The ever-increasing concentrations of autos is resulting in high proportions of undesirable exhaust gas products in the atmosphere especially since these combustion products are known to react in the atmosphere under the influence of sunlight to produce smog. The conversion of exhaust gases to harmless carbon dioxide and water may be carried out by a catalytic or noncatalytic thermal conversion. The latter requires a sufficiently high temperature, in the presence of oxygen, to maintain burning of the combustible components in the exhaust gas stream. On the other hand, the catalytic system effects a contacting of the gas stream with the catalyst particles to permit oxidation and conversion of the combustible components at lower temperatures than can normally be effected in a thermal "afterburner" system.

Although the catalytic treatment of exhaust gases is of advantage in that there is a generally lower temperature range for the combustion operation than with the "afterburner" types, there are temperature fluctuations which can provide undue stresses in the converter. For example, when a catalyst unit is receiving exhaust gases from an engine producing gas more than normally rich in combustibles, then there is a tendency toward high temperature conditions in a portion of the unit. In other words, during certain modes of operation and most noticeably during deceleration modes, there may be a hot glowing catalyst surface at the entrance of the catalyst bed which will provide ignition and flame propagation in the entering gas-air mixture. As ignition occurs, a flame front is formed within the inlet portion of the catalytic converter. Flame formation and cessation is extremely rapid, with temperatures in the inlet portion of the device thus fluctuating widely and reaching high levels. For instance, in one test operation, it was found that temperatures varied from about 900° F. to about 1900° F. in the inlet plenum or manifold section of a catalytic converter operating on a repeating 13 mode cycle of 3½ minutes, including the stages of idle, acceleration, cruise, deceleration, etc. Under these conditions it may be seen that the catalyst bed inlet screen in particular is subjected to high temperature oxidizing conditions and to rapid thermal stress reversals. This combination of conditions leads to warpage and breakage of the inlet screen which may in turn lead to inefficiency of the unit by reason of poor gas flow and loss of catalyst from the retaining section.

It is a principal object of the present invention to provide a gas permeable insulating layer between the catalyst particles in the bed of the converter and the gas distributing screen or perforate member at the inlet end of the catalyst retaining section to preclude rapid temperature fluctuations and damage to such member resulting from flame propagation from the hot inlet surface of the catalyst bed to the incoming gas mixture or from heat transfer from the bed inlet surface to such member.

The gas permeable insulating layer may be a blanket-like layer of refractory positioned in a manner to rest adjacent to the inlet screen or perforate retaining member or there may be a layer of inert spheres or particles adjacent such member to preclude contact with the high temperature catalyst particles. Where inert particles or spheres are used, it is also an object of the present invention to utilize a perforate alloy screen or gauze at a spaced distance from the inlet member to effect the holding of such inert refractory particles between the perforate catalyst retaining member and the catalyst bed itself to insure their proper positioning for all shapes of units.

In one embodiment the present invention provides an improved design and arrangement for a catalytic converter-muffler for exhaust gases, which comprises in combination, a converter chamber having a gas inlet port and a gas outlet port, spaced apart perforate partitioning means within said chamber providing a confined catalyst particle retaining section, in addition said spaced apart perforate partitioning means are positioned and arranged in said chamber in a manner forming with said inlet port a gas distribution section and forming with said outlet port a gas collection section, whereby exhaust gases may be passed uniformly through said catalyst retaining section for treatment therein, and a permeable inert layer of refractory positioned between the catalyst particles in said catalyst retaining section and the inner face of said upstream perforate partitioning means to thereby separate the latter from high temperature conditions in the upstream portion of said catalyst retaining section and also to prevent "flashback" or flame propagation from the inlet surface of the catalyst bed to the incoming gas mixture in the inlet plenum.

As indicated hereinbefore, it is not intended to limit the use of an inert refractory layer to any one particular material or physical arrangement, since it is desired that the refractory be serving primarily as an insulator and as a flame arrestor between the hot oxidizing catalyst particles and the catalyst retaining member in the converter. The refractory may be in the form of a continuous mat-like layer or "blanket" as long as the refractory material utilized is capable of withstanding the high temperature conditions and will not oxidize or powder excessively or lose its shape and position within the converter.

In other embodiments, the protective layer may be formed from inert high temperature resistant particles of spherical or non-spherical shapes. Such particles will generally comprise various refractory inorganic oxides, including alumina, silica, magnesia, boria, zirconia, etc., or mixtures thereof. Particles may also be formed of various hard refractory ceramic-like materials, such as porcelain, carborundum and the like; however, preferably the inert particles are those which have a high degree of porosity and low density such that their insulating ability is optimum within a narrow or thin confined space.

A preferred embodiment utilizing inert refractory particles may utilize a screen or other perforate member spaced closely adjacent the inlet screen or perforate member of the retaining section such that the inert particles are retained in their proper position and adjacent to such inlet member of the retaining section and precluded from intermixing with catalyst particles. The separating screening may, of course, be fabricated from relatively thin or lightweight metallic gauze or perforate plate since it is acting primarily as a separating membrane and need have no particular holding strength.

In a somewhat more specific embodiment, the present invention provides an improved converter-muffler for exhaust gases which comprises in combination, a converter chamber having a gas inlet port and a gas outlet port, spaced apart perforate partitioning means within said chamber providing a confined catalyst particle retaining section, in addition said spaced apart perforate partitioning means are positioned and arranged in said chamber in a manner forming with said inlet port a gas distribution section and forming with said outlet port a gas collection section, whereby exhaust gases may be passed uniformly through said catalyst retaining section for treatment therein, a gas permeable metal screening spaced closely adjacent the upstream perforate partitioning means within said catalyst retaining section and forming thereby an inert particle retaining section, and subdivided inert refractory particles within said inert particle retaining section to thereby insulate said upstream perforate partitioning means from high temperature conditions in said catalyst retaining section and to prevent ignition of the incoming gas mixture in the inlet plenum.

Although it is not intended to limit the inert refractory to any particular material, the use of low density porous alumina spheres does provide one preferred form of inert particle which may be utilized in a layer-like arrangement between the catalyst particles and the inlet screen of the catalyst section. Alumina spheres may be prepared in various ways; for example, in the manner set forth in the James Hoekstra Patent No. 2,620,314. The size of the spheres may vary; however, preferably they are in the range of $\frac{1}{32}''$ to $\frac{5}{16}''$ mean diameter and preferably from about $\frac{3}{32}''$ to $\frac{3}{16}''$ mean diameter. Also, the minimum thickneess of the layer should not be less than about twice the diameter of the inert particles, but preferably not less than about three times average sphere diameter.

Various modifications of the invention may be better described and set forth, as well as additional advantages noted, by reference to the accompanying drawing and the following description thereof.

FIGURE 1 of the drawing indicates diagrammatically the utilization of an inert barrier layer held along the inlet face of a catalyst retaining section which has a sloping position in the converter-muffler.

Figure 2:
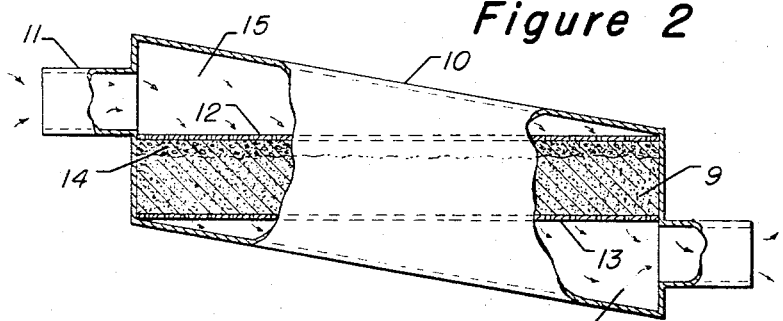

FIGURE 2 of the drawing indicates diagrammatically the utilization of inert insulating particles differing in size or density from the catalyst particles such that they automatically maintain an upper position against a substantially horizontal catalyst retaining section.

Figure 3:
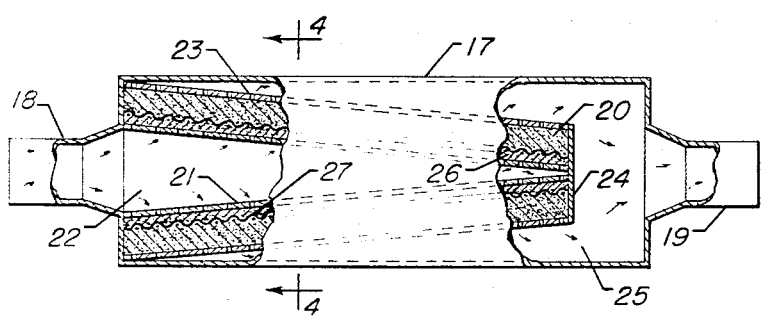

FIGURE 3 of the drawing indicates a tubular or conical form of converter-muffler utilizing a tapering cylindrical form of catalyst section and a similarly shaped inert barrier layer along the tapering inlet manifold of the unit.

Figure 4:
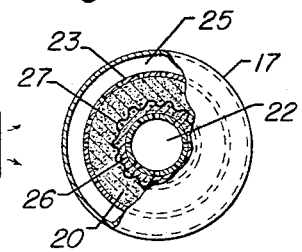

FIGURE 4 of the drawing is a sectional view through the apparatus of FIGURE 3 as indicated by the line 4—4 in FIGURE 3.

Figure 5:
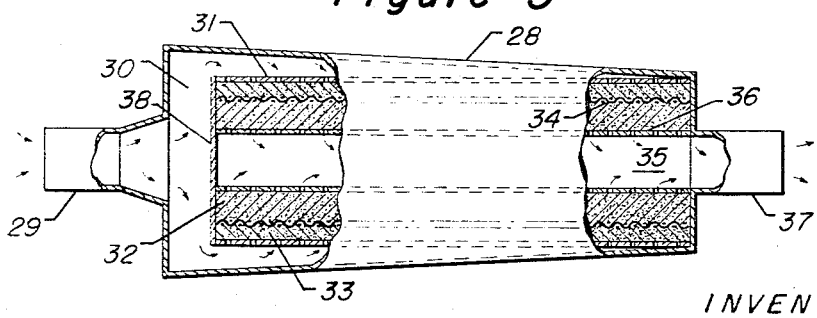

FIGURE 5 of the drawing is a modified tubular form converter-muffler providing annular shaped catalyst retaining section with an external protective layer of inert particles to accommodate a radial inward flow of exhaust gases through the converter.

Referring now to FIGURE 1 of the drawing there is shown a converted housing 1 having inlet port 2 and outlet port 3 to accommodate an exhaust gas stream flow. Internally of the housing are spaced perforate members 4 and 5 providing a particle retaining section therebetween. The lower and larger proportion of the space between the perforate members is filled with catalytic material 6 capable of effecting catalytic oxidation of the combustibles in the exhaust gas stream. Also, in accordance with the present invention there is provided a layer of inert refractory particles 7 above the catalyst bed 6 and adjacent the downstream face of perforate member 4. In order to preclude mixing of the catalyst particles 6 and the inert particles 7 there is a separating screen 8 extending across the entire surface area of the catalyst section.

It is to be understood that the present drawing is merely diagrammatic and that the flow of exhaust gases may be upwardly through the catalyst retaining section, rather than downward as shown, in which case the protective layer of particles 7 will be positioned below the main bed of catalyst particles along its inlet face. A protective layer of inert particles or an insulating blanket form of refractory, may, of course, extend along each perforate retaining member for the catalyst retaining section; however, as indicated hereinbefore the wide temperature fluctuations within the converter occur along the inlet face of the catalyst section where there is rapid ignition and formation of flame fronts in the inlet plenum ahead of the bed, as well as rapid cooling as the vehicle engine changes its mode of operation to provide a less rich exhaust gas stream. The screening 8 is normally supplied from a lightweight metal alloy gauze being only sufficiently strong to preclude movement between particles 6 and particles 7. The actual support of the particles within the retaining section is provided by perforate members 4 and 5 which in turn may be supplied of heavy gauge material or suitably reinforced with stiffener members, or the like. The particles within the thin layer 7 may be of porous alumina, silica, silica-alumina, or the like, as hereinbefore set forth, but in any case shall be of an inert nature which will not initiate oxidation of combustible components therein so that they will serve as an effective insulating barrier between member 4 and the bed 6.

In FIGURE 2 of the drawing there is shown a modified arrangement of the converter of FIGURE 1, providing a substantially horizontal catalyst bed 9 within a converter chamber 10 having an upper inlet port 11 to provide a downflow therethrough. A particle retaining section is formed by spaced perforate members 12 and 13, and there are accommodated therein catalyst particles 9 together with an upper layer of inert particles 14. In the present embodiment the inert particles 14 of alumina or of other porous inert refractory, are indicated to be of a larger size or lower density than the catalyst particles 9 such that they will stay on the top of the latter in the retaining section even though subjected to vibrations from vehicular movement or gas stream pulsations. The maintenance of the inert particles along the inlet surface of the catalyst 9 thus precludes high temperature conditions therein from igniting the incoming gas mixture and from having an undue effect upon the inlet perforate member 12. As noted, the present embodiment provides a downflow from an upper inlet port 11 and distributing manifold section 15 to an outlet manifold section 16; however, where there is an upflow through the catalyst section, the size or density difference of the particles will be reversed. The inert refractory layer will be comprised of smaller diameter or higher density particles than the catalyst particles to thereby maintain a position along the lower inlet face of the catalyst section and adjacent the perforate inlet member.

In FIGURES 3 and 4 of the drawing there is indicated a cylindrical form of converter-muffler having a housing 17 provided with inlet port 18 and an outlet port 19 to accommodate an outward radial flow through an annular form of catalyst section 20. An inner conically shaped perforate member 21 defines an inlet manifold section 22 as well as provide an inlet member for the catalyst retaining section 20. The inner inlet member 21 is encompassed by an outer frusto-conical perforate member 23 while a non-perforate end member 24 precludes longitudinal flow of gases through the catalyst bed 20 and retains the outward radial flow of gases into an outer gas collection section 25 which communicates with the outlet port 19. Here again, a layer of inert refractory material 26 is maintained adjacent the inner face of the perforate means 21 to the catalyst section such that there is in effect an insulating and flame arresting barrier between the upstream face of catalyst 20 and perforate member 21. Where the layer 26 comprises spherical particles or other particulate refractory a suitable separating screen 27 is maintained between the two types of particles in order to insure their separation and the maintenance of an insulating barrier adjacent the upstream face of the catalyst section to preclude both the rapid temperature fluctuations of the catalyst bed acting against the metal supporting member 21 and ignition of the gas mixture in inlet section 22 by the hot inlet face of the catalyst bed. The same annular design and arrangement may, of course, be utilized with oval-form converter chambers rather than cylindrical, and the same separation of particles maintained along with the outward radial flow of gases.

The present embodiment, as well as the previously described embodiments, may utilize perforate sheets or blanket-like layers of porous or perforate refractory which is preformed to the desired shape. Alternatively the layer utilized may be of a pliable mineral wool type of form capable of readily conforming with the shape of the perforate inlet support member to the catalyst section. With the insulating barrier of inert materials in a preformed design or of a mat-like structure, then, of course, the separating screen 27 may be eliminated from the embodiment.

FIGURE 5 of the drawing shows a modified cylindrical or oval form arrangement for a converter-muffler utilizing a radial inward flow of gases by having an outer chamber 28 with an inlet port 29 leading into an outer gas distributing space 30 arranged around a perforate member 31 to catalyst section 32. In other words, the gas flow passes radially inwardly through perforate member 31, porous refractory particles or layer 33, dividing screen 34, and catalyst bed 32 into an inner gas collecting section 35 formed by inner perforate tubular member 36 and end plate 38. The collecting section 35 is coextensive with and discharges directly into outlet port 37 from the housing 28. The present modified arrangement indicates the use of a separating alloy metal screen 34 for the refractory layer 33 and the catalyst bed 32. Here, again, where a continuous preformed mat or layer of porous refractory is utilized, then such member may be eliminated.

As indicated hereinbefore, the protective inert layer, such as 33, shall have sufficient thickness or depth to act as a flame arrester between the hot inlet face of the catalyst bed and the perforate supporting member for the catalyst retaining section. Thus, such layer shall be of the order of about $\frac{1}{8}$ inch to about $\frac{5}{8}$ inch thick. Where spherical particles of an inorganic metal oxide are utilized, such as alumina, there will be an average thickness accommodating substantially two to three sphere diameters for particles having an average diameter of $\frac{3}{32}$ inch to $\frac{3}{8}$ inch mean diameter. Still further, it is not intended to limit refractory particles to a spherical form inasmuch as extruded particles may have a cylindrical or polygonal form, which in turn have a low density porous structure. It is not intended to limit the present invention to any one method of manufacture of the inert particles or of the sheet-like layer of porous refractory. All particles or materials are preferably of low density and various methods may be utilized to effect low density, as for example, in accordance with the teachings of the aforementioned Patent No. 2,620,314. For purposes of the layer acting as a flame arrestor, the density is not particularly critical; however, for purposes of reducing temperature fluctuations and increasing insulation capabilities in the unit, it is preferred that the spherical particles of alumina or compounds of other inorganic oxides will have an average bulk density of less than 0.4 (expressed as grams per cubic centimeter) and preferably less than 0.30.

I claim as my invention:

1. A catalytic converter-muffler for exhaust gases which comprises in combination,
   (a) a converter chamber having a gas inlet port and a gas outlet port,
   (b) spaced apart perforate partitioning means within said chamber providing a confined catalyst particle retaining section,
   (c) in addition said spaced apart perforate partitioning means are positioned and arranged in said chamber in a manner forming with said inlet port a gas distribution section and forming with said outlet port a gas collection section, whereby exhaust gases may be passed uniformly through said catalyst retaining section for treatment therein, and
   (d) a permeable layer of inert porous refractory particles having a low bulk density of less than about 0.4 gram per cubic centimeter and positioned between the catalyst particles in said catalyst retaining section and the inner face of said upstream perforate partitioning means to thereby separate the latter from high temperature conditions in said catalyst retaining section.

2. A catalytic-converter-muffler for exhaust gases which comprises in combination,
   (a) a converter chamber having a gas inlet port and a gas outlet port,
   (b) spaced apart perforate partitioning means within said chamber providing a confined catalyst particle retaining section,
   (c) in addition said spaced apart perforate partitioning means are positioned and arranged in said chamber in a manner forming with said inlet port a gas distribution section and forming with said outlet port a gas collection section, whereby exhaust gases may be passed uniformly through said catalyst retaining section for treatment therein, and
   (d) a gas permeable metal screening positioned and spaced closely adjacent the upstream perforate partitioning means within said catalyst retaining section and forming thereby an inert particle retaining section, and
   (e) subdivided inert porous refractory particles having a low bulk density of less than about 0.4 gram per cubic centimeter disposed within said inert particle retaining section to thereby separate the perforate partitioning means from high temperature conditions in said catalyst retaining section within the upstream portion of said converter-muffler.

3. The converter-muffler of claim 2 further characterized in that said inert refractory particles comprise alumina and have a low bulk density of less than about 0.30 gram per cubic centimeter.

4. The converter-muffler of claim 2 further characterized in that said inert refractory particles within said inert particle retaining section have a mean diameter of $\frac{1}{32}$ inch to $\frac{5}{16}$ inch and said metal screening is spaced from the inner face of said perforate partitioning means a distance providing a layer of inert particles equivalent to not less than twice the average diameter of said inert particles.

References Cited
UNITED STATES PATENTS

| | | | |
|---|---|---|---|
| 1,256,301 | 2/1918 | Ellis | 158—99 |
| 2,775,294 | 12/1956 | Schwank. | |
| 2,898,202 | 8/1959 | Houdry et al. | 23—288 |
| 3,154,389 | 10/1964 | Hayes et al. | 23—288 |
| 3,189,417 | 6/1965 | Houdry et al. | 23—288 |
| 3,205,049 | 9/1965 | Lannert et al. | 23—288 X |
| 3,270,798 | 9/1966 | Ruff | 158—99 |

JOSEPH SCOVRONEK, *Primary Examiner.*